Sept. 28, 1965 W. E. CLACK 3,208,476
AUTOMATIC CONTROL VALVES FOR FLUID CONDITIONING SYSTEMS
Filed Nov. 1, 1961 4 Sheets-Sheet 1

INVENTOR.
WILLIS E. CLACK
BY Joseph G. Werner
ATTORNEY

Sept. 28, 1965 W. E. CLACK 3,208,476
AUTOMATIC CONTROL VALVES FOR FLUID CONDITIONING SYSTEMS
Filed Nov. 1, 1961 4 Sheets-Sheet 2

INVENTOR.
WILLIS E. CLACK
BY Joseph G. Werner
ATTORNEY

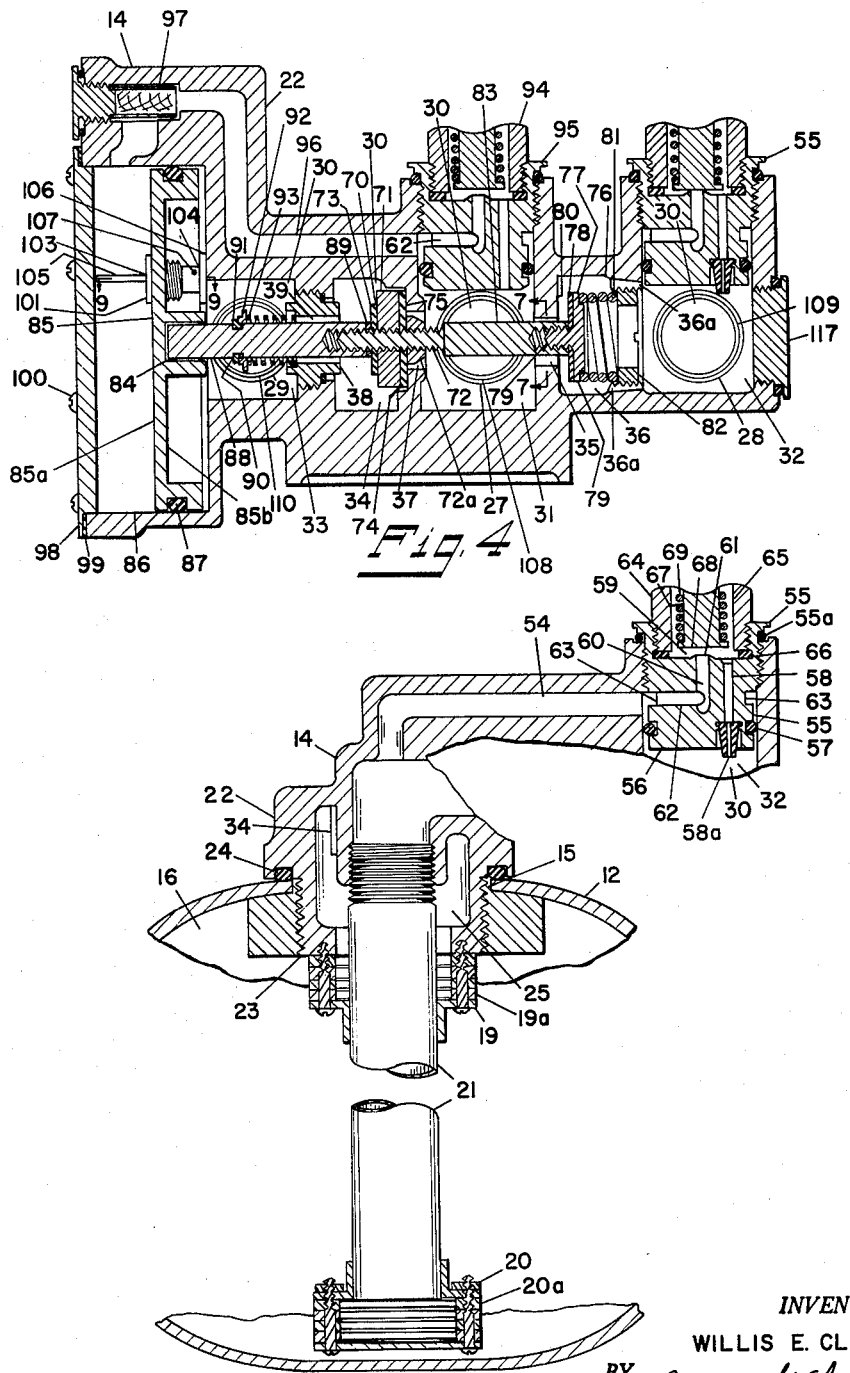

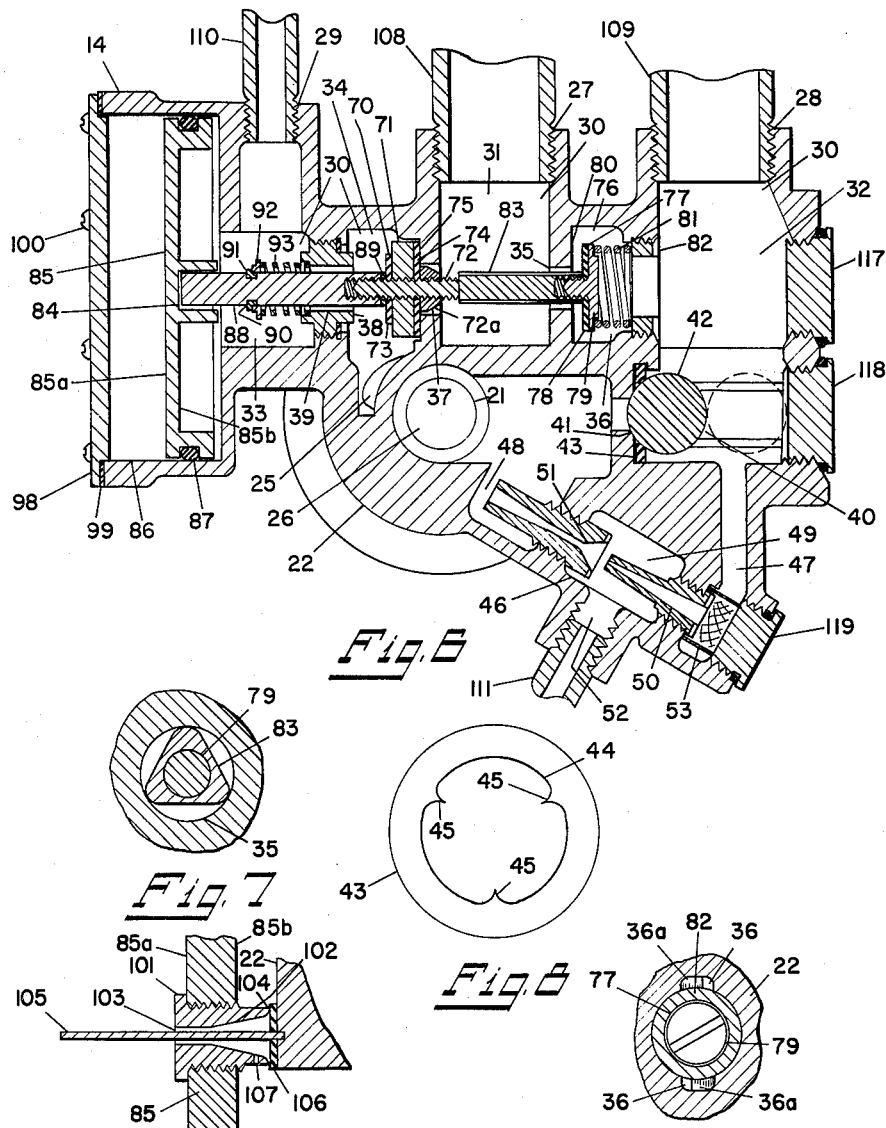

United States Patent Office 3,208,476
Patented Sept. 28, 1965

3,208,476
AUTOMATIC CONTROL VALVES FOR FLUID CONDITIONING SYSTEMS
Willis E. Clack, Madison, Wis., assignor to Clack Corporation, a corporation of Wisconsin
Filed Nov. 1, 1961, Ser. No. 149,265
11 Claims. (Cl. 137—599.1)

This invention relates to automatic control valves for fluid conditioning systems and more specifically, automatic control valves for water conditioning systems.

It is a primary object of my invention to provide an automatic control valve for a water conditioning system which can be attached directly to a mineral tank and thereby eliminate the need for excess external piping.

It is a further object of my invention to provide an automatic control valve for a water conditioning system which permits efficient regeneration of the system with the use of a minimum amount of water.

It is a still further object of my invention to provide an automatic control valve for a water conditioning system which introduces a minimum amount of raw water into the conditioned water supply during regeneration of the system.

It is an additional object of my invention to provide a single compact automatic control valve for a water conditioning system which has a minimum of moving parts and which is completely accessible at the top of the mineral tank.

Another object of my invention is to provide an automatic control valve for a water conditioning system which operates quietly and does not cause an objectionable "banging" in the pipes of the water system.

Other objects and advantages of the invention will be apparent from the following detailed explanation taken in conjunction with the accompanying drawings wherein a preferred embodiment of the principles of the invention has been selected for exemplification.

In the drawings:

FIG. 4 is a partial section view of my automatic control valve taken along the same section line as FIG. 3 illustrating the relative position of the piston and connected parts during the regeneration cycle of operation.

FIG. 5 is a partial section view of my automatic control valve taken along section line 5—5 of FIG. 1 showing the fast rinse passage and fast rinse control means.

FIG. 6 is a partial section view taken along section line 6—6 of FIG. 1 showing the injector means and ball check valve for my automatic control valve.

FIG. 7 is a partial section view taken along section line 7—7 of FIG. 4 showing the relation of the bypass port and the bypass plunger of my invention.

FIG. 8 is an end view of the ballcheck buffer for the check valve chamber of my automatic control valve.

FIG. 9 is a partial section view taken along line 9—9 of FIG. 4 showing the piston bleed-off insert of my invention.

FIG. 10 is a partial section view taken along section line 10—10 of FIG. 3 showing the spiral bypass grooves of my automatic control valve.

Figure 2:
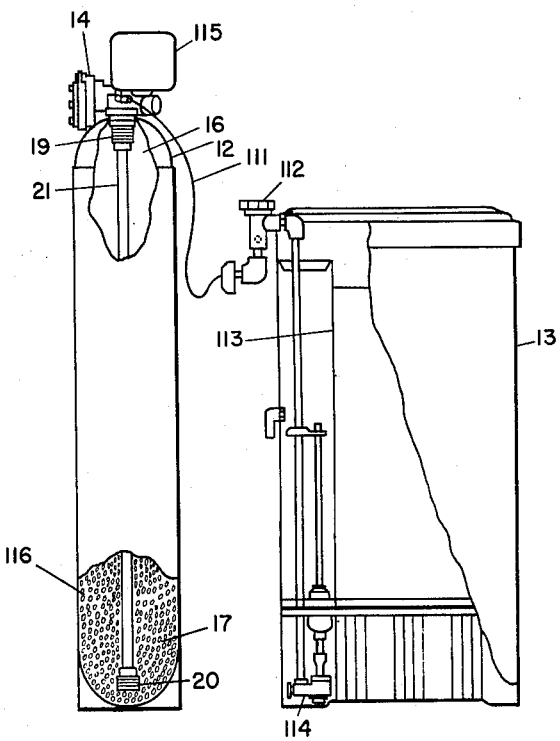
FIG. 2 is a partial front elevation view of the control valve of FIG. 1 mounted on a water conditioning system mineral tank and connected to a salt storage tank.

Referring more specifically to the drawings in which like members refer to like parts, the mineral tank 12 and salt storage tank 13 illustrated in FIG. 2 are of the type used in connection with residential water softeners, but it is to be understood that my invention is equally well suited for other commercial and industrial water conditioning uses.

Figure 1:
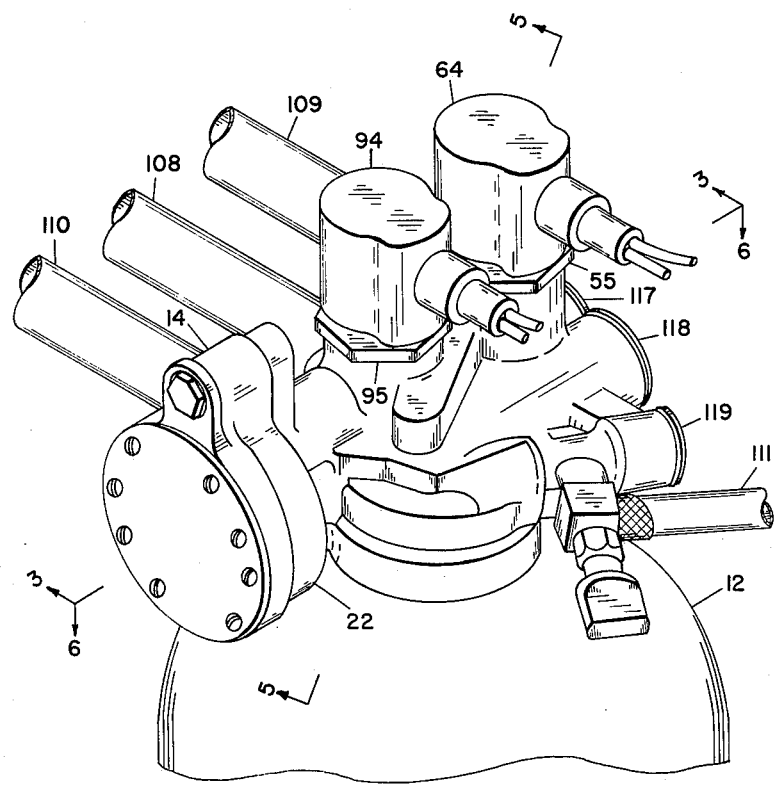
FIG. 1 is a partial perspective view of the compact automatic control valve of my invention mounted on a mineral tank.

Referring to FIGS. 1 and 5, the automatic control valve assembly 14 is directly attached to the mineral tank 12. This direct attachment feature eliminates all external piping between the valve 14 and the tank 12 and provides a more compact system. The control valve main body 22 preferably has a downwardly extending tank fitting 23 which threadedly engages the mineral tank inlet opening 15. An "O" ring 24 encompasses the tank fitting 23 to provide a liquid-tight seal when the main valve body 22 and mineral tank 12 are attached in tightened relation as shown.

FIG. 5 further illustrates the valve body water conditioning outlet 25 and the conditioned water inlet 26, which may preferably extend downward within the water conditioning outlet 25. The water conditioning outlet 25 is in communication with the upper portion 16 of the mineral tank 12 by means of the upper distributor 19, which is attached to the main body tank fitting 23 in fixed relation. The upper distributor 19 consists of a plurality of spaced distributor segments 19a between which water may flow from the water conditioning outlet 25 to the mineral tank upper portion 16. The distance between the spaced upper distributor segments 19a may vary considerably, but I have found the range of .013 inch to .016 inch to be suitable for water softening service.

The conditioned water inlet 25 is in communication with the lower portion 17 of the mineral tank 12 by means of the internal riser pipe 21 and the lower distributor 20. The internal riser pipe 21 extends upward from the lower distributor 20, passes through the upper distributor 19 in slidable relation, and threadedly engages the main valve body 22 in communication with the conditioned water inlet 26. The lower distributor 20 consists of a plurality of spaced distributor segments 20a which are similar to the upper distributor segments 19a.

My control valve main body 22 also has a raw water inlet opening 27, a conditioned water outlet opening 28, a drain opening 29, and a distribution section 30, as best shown in FIG. 6. The distribution section 30 has an inlet chamber 31 in communication with the raw water inlet opening 27, an outlet chamber 32 in communication with the conditioned water outlet opening 28, a drain chamber 33 in communication with the drain opening 29 and an intermediate chamber 34 in communication with the water conditioning outlet 25. The inlet chamber 31 and outlet chamber 32 are separated by a bypass port 35 and a bypass assembly chamber 36. The inlet chamber 31 and intermediate chamber 34 are separated by a service port 37. The drain chamber 33 and the intermediate chamber 34 are separated by a drain seat 38 having a drain passage 39 extending therethrough, as shown.

FIG. 6 shows the check valve chamber 40 extending between the conditioned water inlet 26 and the outlet chamber 32. The check valve chamber 40 has a valve seat 41 and a check ball 42 adapted to be engaged by the ball seat 41 in substantially liquid-tight relation. It can be seen from FIG. 6 that when water is directed from the outlet chamber 32 into the check valve chamber 40 the check ball 42 will be forced against the valve seat 41 in the position shown to prevent the water from flowing directly into the conditioned water inlet 26. When water is directed from the conditioned water inlet 26 to the check valve chamber 40 the check ball 42 will be forced away from the valve seat 41 and against the check valve chamber plug 118 to permit the flow of water through the check valve chamber 40 and into the outlet chamber 32. The open position of the check ball 42 is indicated by the dotted lines in FIG. 6.

A check ball buffer 43 is preferably located adjacent to the valve seat 41 as shown. FIG. 8 illustrates a preferred type of buffer 43 which has a resilient body portion 43 with a substantially circular center opening 44. A plurality of lugs 45 extend from the body portion 43 into the center opening 44 a short distance as shown. In use the buffer 43 is positioned with its center opening 44 substantially concentric with the valve seat 41. The resilient lugs 45 engage the check ball 42 as it is forced toward the valve seat 41. The resistance of the resilient lugs 45 slows the movement of the check ball 42 and reduces the amount of force with which it engages the valve seat 41.

The check valve chamber 40 containing my check ball buffer 43 is a great improvement over standard check valves having no buffers. Standard check valves produce a loud "bang" in the water system when the check ball 42 engages the valve seat. The resilient lugs 45 of my buffer 43 eliminate "banging" pipes but do not prevent the check ball 42 from engaging the valve seat 41 fully in substantially water tight relation.

My automatic control valve 14 has injector means 46 whereby to bypass the engaged check ball 42 and valve seat 41. The injector means 46 has an inlet passage 47 in communication with the check chamber 40 and the outlet chamber 32, and an outlet passage 48 in communication with the conditioned water inlet 26. An injector nozzle 50 is located in communication with the inlet passage 47 and is adapted to direct a stream of water into an injector throat 51 in communication with the outlet passage 48. The nozzle 50 and throat 51 are in communication within the injector chamber 49, which has a brine inlet opening 52 extending therefrom. An injector screen 53 is preferably located within the injector inlet passage 47, as shown, to prevent any foreign material from entering and plugging the nozzle 50.

FIG. 5 shows the fast rinse passage 54 extending from the outlet chamber 32 to the conditioned water inlet 26. A solenoid insert 55 with an upper "O" ring gasket 55a threadedly engages the outlet chamber 32 in water-tight relation. The insert 55 has an extension end 56 with a lower "O" ring gasket 57 engaged within the outlet chamber 32 and below the fast rinse passage 54 in substantially water-tight relation as shown. A conventional solenoid 64, shown more fully in FIG. 1, is threadedly attached to the insert solenoid adapted chamber 59 to provide control means for selectively directly a flow of water from the outlet chamber 32 through the fast rinse passage 54 to the conditioned water inlet 26. The solenoid insert 55 has an inlet passage 58 extending from the extension end 56, where it communicates with the outlet chamber 32, to the adapter chamber 59. A center passage 60 having an upwardly extending seat 61 extends downward into the insert 55 to communicate with the outlet passage 62. The outlet passage 62 opens on an arcuate channel 63 extending around the insert 55 in communication with the fast rinse passage 54.

The fast rinse solenoid 64 has a downwardly extending tube 65 which is threadedly attached to the solenoid insert 55 in communication with the adapter chamber 59 and the insert inlet passage 58 and center passage 60. A quad ring 66 is preferably employed to provide a water-tight connection between the insert 55 and the solenoid tube 65. A plunger 67, having a lower end 68 adapted to engage the center passage seat 61 in substantially water-tight relation, is located within the tube 65. A plunger spring 69 encompasses the plunger 67 to help maintain it in engaged relation with the center passage seat 61 when the solenoid 64 is de-energized.

When it is desired that water be directed through the fast rinse passage 54, the fast rinse solenoid 64 is energized, whereby the plunger 67 is retracted upward within the solenoid tube 65 to the position illustrated in FIG. 5. the water within the outlet chamber 32 then flows up the inlet passage 58, down the center passage 60 to the outlet passage 62 where it is directed into the fast rinse passage 54. My solenoid insert inlet passage 58 is adapted to receive a constant flow "Flo-et" insert 58a, more fully described in U.S. Pat. No. 2,764,183, which provides for a constant volume flow through the solenoid insert 55, despite variations of the water pressure in the outlet chamber 32.

Valve means 70 and bypass means 76 are located within the distribution section 30 to selectively close the service port 37, the drain passage 39 and the bypass port 35 and thereby direct the flow of water through the control valve 14 as desired.

Figure 3:
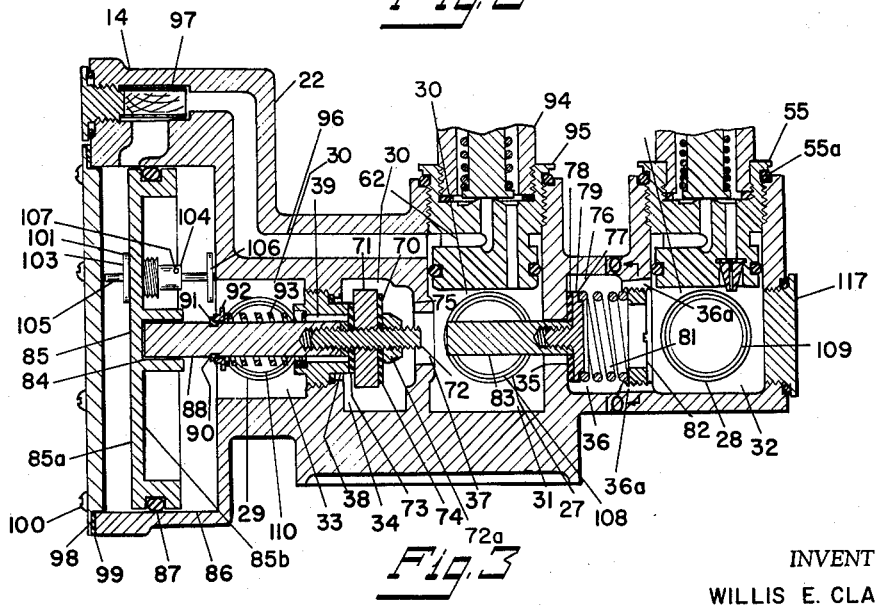
FIG. 3 is a partial section view of my automatic control valve taken along section line 3—3 of FIG. 1 illustrating the relative position of the piston and connected parts during the water conditioning "service" phase of operation.

Referring to FIG. 3, the valve means 70 can be seen to include a valve retainer 71 located within the intermediate chamber 34 in movable relation. The valve retainer 71 carries a drain valve 73, which is shown in substantially water-tight engagement with the drain seat 38 to close the drain passage 39 extending from the intermediate chamber 34 to the drain chamber 33. The valve retainer 71 also carries a service valve 74 adapted to bear against the service port seat 75 in the manner illustrated by FIG. 4, and close the service port 37 extending from the inlet chamber 31 to the intermediate chamber 34. The service valve 74 is maintained in close relation to the valve retainer 71 by the retainer nut 72a carried by the retainer stem 72. It can be seen from FIGS. 3 and 4 that when the drain valve 73 is engaged against the drain seat 38 to close the drain passage 39, the service port 37 is open to permit communication between the inlet and intermediate chambers 31 and 34. Likewise, when the service valve 74 is engaged against the service port seat 75 to close the service port 37, the drain passage 39 is open to permit communication between the intermediate and drain chambers 34 and 33.

The bypass means 76 includes a bypass assembly 77, located within the bypass assembly chamber 36. The bypass assembly 77 has a retainer screw 79 which carries a bypass valve 78. The bypass valve 78 is forced against the bypass port seat 80 in removable, substantially water-tight relation by the action of the valve spring 81 against the retainer screws 79. The bypass valve spring 81 is maintained in position by the bypass valve spring retainer 82, which is threadedly attached to the main valve body 22. A bypass plunger 83 is engaged by the retainer screw 79 in fixed relation and extends through the bypass port 35 in spaced relation and into the inlet chamber 31, substantially in alignment with the valve means retainer stem 72. FIG. 7 illustrates the relation of the preferably triangular bypass plunger 83 and the substantially circular bypass port 35. It is obvious that the plunger 83 and port 35 could have different configurations provided the port 35 would serve as a guide for the plunger 83 and that sufficient space existed between the two elements to allow the passage of water when the bypass valve 78 is disengaged from the bypass port seat 80, as illustrated by FIGS. 4 and 6. Bypass grooves 36a may extend through said control valve main body 22 and past said bypass spring retainer 82 to connect said bypass chamber 36 and said outlet chamber 32. FIG. 10 more clearly shows the bypass grooves 36a, which are preferably disposed in spiral relation to provide easier threading of the spring retainer 82 within the main body portion 22.

FIGS. 3, 4 and 6 illustrate the novel actuator means 84 for my valve means 70 and bypass means 76, which includes a piston 85 slidably engaged with a main body piston chamber 86 in substantially water-tight relation. The piston chamber 86 has a gasket 99 and a cover 98 which are attached to the chamber 86 in water-tight relation by means of attachment screws 100. A piston "O" ring 87 provides the seal between the piston 85 and the piston chamber 86. The piston 85 is connected to the valve means 70 by a valve stem 88. The valve stem 88 is threadedly attached to the retainer stem 72 in fixed relation and bears against a retainer washer 89 to maintain the drain valve 73 in close relation to the valve retainer 71. The valve stem 88 extends through the drain passage 39 in spaced relation and is slidably engaged by the piston 85 in communication with the piston rear face 85b. The valve stem 88 carries a piston return spring 93, which is retained in place between the drain seat 38 and the return spring retainer 92 by a "C" washer 91 engaged in the valve stem locking groove 90 in locked relation.

The actuator means 84 is controlled by a distribution solenoid 94, which is attached to a solenoid insert 95 in communication with the inlet chamber 31. The distribution solenoid 94 and the solenoid insert 95 are identical to the fast rinse solenoid 64 and solenoid insert 55, except that solenoid insert 95 does not require the constant flow "Flo-et" insert 58a. The outlet passage 62 of solenoid insert 95 is in communication with a control passage 96 which extends from the inlet chamber 31 to the piston chamber 86 in communication with the piston front face 85a.

When the distribution solenoid 94 is energized, water is permitted to flow from the inlet chamber 31 through the solenoid insert 95 and the control passage 96 to the piston chamber 86 in the same manner as described above with respect to the fast rinse solenoid 64. The water is forced against the piston front face 85a to displace the piston 85 in the direction of the service port 37, and cause the connected service valve 74 to engage the service port seat 75 in substantially water-tight relation, as illustrated in FIGS. 4 and 6. As the piston 85 starts its above-described movement in the direction of the service port 37, the drain valve 73 is disengaged from the drain seat 38 and the drain passage 39 is opened. As the piston 85 continues its movement in the direction of the service port 37, the retainer stem 72 engages the aligned bypass plunger 83 to displace the plunger 83 in the direction of the spring retainer 82 and disengage the bypass valve 78 from the bypass port seat 80, thereby opening the bypass port 35. FIGS. 4 and 6 show the relative positions of the bypass means 76, the valve means 70, and the actuator means 84 when the distribution solenoid 94 is energized.

The piston 85 has a bleed-off insert 101 extending therethrough from the front face 85a to the rear face 85b as best shown in FIG. 9. The bleed-off insert 101 has a tapered center opening 102 with a restricted inlet end 103 in communication with the piston front face 85a and an outlet end 104. A guide pin 105 extends across the piston chamber 86 from the main valve body 22 through the insert center opening 102 in spaced relation to a point near the chamber cover 98. The guide pin 105 supports an insert seat 106 adjacent to the main valve body 22 and maintains the piston 85 and the bleed-off insert 101 in proper alignment with the valve body 22 during all phases of valve operation. The insert outlet end 104 is adapted to engage the insert seat 106 in substantially water-tight relation when the piston 85 is in the position shown in FIG. 4. A very small bleed-off hole 107 extends outward from the center opening 102 in communication with the piston rear face 85b and the drain chamber 33. The size of the bleed-off hole 102 may vary with the system, but I have found that a No. 70 drill hole is suitable for most installations.

When the distribution solenoid 94 is de-energized, communication between the inlet chamber 31 and the control passage 96 is terminated in the manner described with relation to the de-energizing of the fast rinse solenoid 64 and the terminating of communication between the outlet chamber 32 and the fast rinse passage 54.

The water bearing on the piston front face 85a remains under substantial pressure when the distribution solenoid 94 is de-energized due to the action of the piston return spring 93 against the valve stem 88. The water is prevented from flowing through the bleed-off insert center opening 102 to the lower pressure drain chamber 33 by the insert seat 106. However, a very small amount of water is bled off from the piston chamber 86 to the drain chamber 33 through the bleed-off insert center opening 102 and bleed-off hole 107. As the initial bleed-off of the trapped water progresses, the volume of water in the piston chamber 86 and the control passage 96 decreases, thereby allowing the return spring 93 to displace the piston 85 a slight distance toward the piston cover 98. Such movement disengages the bleed-off insert 101 from the insert seat 106, whereupon the rate of bleed-off is greatly increased through the insert outlet end 104 to allow the return spring 93 to rapidly return the piston 85 to the position illustrated in FIG. 3. A screen 97 is preferably located within the control passage 96 to prevent foreign materials from entering the piston chamber 86 and plugging the small bleed-off hole 107.

In operation with the exemplified water conditioning system, my control valve 14 is attached to the inlet opening 15 of a mineral tank 12 in the manner described above. Inlet, outlet and drain conduits 108, 109 and 110 are attached to inlet, outlet and drain openings 27, 28, and 29, respectively.

A brine line 111 is attached to the brine inlet opening 52 in communication with the injector chamber 49, as shown in FIGS. 1 and 6, and extends to an air check valve 112 mounted on the conventional salt storage tank 13, as shown, or mounted within the tank 13. The salt storage tank 13 has a brine well 113 and a float operated brine valve 114 in communication with the air check valve 112.

An electrically operated timer mechanism 115 is connected electrically to the distribution solenoid 94 and the fast rinse solenoid 64.

My automatic control valve 14 and connected water conditioning system has five operating phases. The frequency and the duration of the phases can be preselected on the electric timer mechanism 115 to meet the demands of the particular installation.

The first control valve operating phase is the "service" or water conditioning phase. The function of the control valve 14 during this normal phase is to direct raw water from the inlet conduit 108 through the mineral tank 12 for softening, and out the outlet conduit 109 for use. During the "service" phase, both solenoids 64 and 94 are de-energized, and the valve means 70, bypass means 76 and actuator means 84 are in the position illustrated by FIG. 3. The raw water enters the inlet chamber 31 through the inlet opening 27, flows through the open service port 37 and into the intermediate chamber 34. From the intermediate chamber 34 the water flows through the communicating water conditioning outlet 25 and the upper distributor 19 to the mineral tank upper portion 16, for conditioning. The mineral tank 12 contains a conventional high capacity resin mineral 116 which conditions the raw water which passes downward therethrough. The conditioned water is forced upward from the lower distributor 20 at the lower portion of the tank 12 through the internal riser pipe 21 into the conditioned water inlet 26. The conditioned water then flows through the check valve chamber 40 to the outlet chamber 32 and out of the valve 14 through the outlet conduit 109. It is noted that the check ball 42 permits the flow of conditioned water through the check valve chamber 40 during "service."

Periodically it is necessary to regenerate the resin mineral 116 in the mineral tank 12. The electric timer mechanism 115 can be preset to automatically regenerate the mineral tank 12 at whatever interval is desired and at whatever time of day that is most convenient.

The second control valve operating phase, which is the first phase of the regeneration cycle, is the "slow brine draw" phase. FIGS. 4 and 6 show the position of the valve means 70, bypass means 76 and actuator means 84 during this operating phase. The electric timer mechanism 115 activates the distribution solenoid 94 at the preselected time to send water through the control passage 96. The water displaces the piston 85 to the position shown in FIG. 4, wherein the service port 37 is closed and the bypass port 38 and drain passage 39 are open. The raw water entering the inlet chamber 31 now flows into the bypass assembly chamber 36 and communicating outlet chamber 32 through the open bypass port 35 and the spiral bypass grooves 36a. While the spiral bypass grooves 36a are not absolutely essential, they are desirable to prevent the water from passing through the restricted spaces between the coils of the compressed bypass valve spring 81, which may produce a loud and objectionable noise. The raw water then enters the check valve chamber 40, forcing the check ball 42 against the buffer lugs 45 and then the check valve seat 41 in substantially water-tight relation to prevent the flow of water directly into the mineral tank 12. The water then flows through the injector inlet passage 47 and screen 53 to the injector nozzle 50. The flow of water through the nozzle 50 and into the injector throat 51 creates an area of reduced pressure within the injector chamber 49. The low pressure within the injector chamber 49 draws salt brine from the salt storage tank 13 through the brine line 111 to the injector chamber 49 at a measured rate. The rate of flow through the nozzle 50 and the rate of brine draw can be varied by changing the size of the nozzle 50 and throat 51. The water-brine mixture passes through the injector throat 51 and conditioned water inlet 26 and communicating internal riser pipe 21 to the lower distributor 20 and the lower portion 17 of the mineral tank 12 at a slow, substantially uniform rate. The mixture is forced upward through the resin mineral 116 in a conventional manner of regeneration and, together with any foreign material which it contains, is forced into the upper distributor 19. From the upper distributor 19 the mixture passes the water conditioning outlet 25, to the communicating intermediate chamber 34, and thence through the drain passage 39 into the drain chamber 33, and out the drain conduit 110. The slow flow rate of the brine mixture through the resin mineral 116 provides a maximum contact time between the brine and the resin mineral 116. Iron built up within the mineral tank will thus tend to be placed in solution and broken down into small particle sizes to maximize the efficiency of the regeneration process. While the flow rate will vary with different systems, I have found that a nozzle 50 which gives a flow rate of approximately .15 gallon per minute is satisfactory for most systems. Such a flow rate will merely churn the brine within the mineral tank 12 and push only a small amount of brine to drain.

The "slow brine draw" phase continues until all the brine has been drawn from the salt storage tank 13. The duration of the slow brine draw phase depends upon the size of the nozzle 50 and throat 51 and the capacity of the salt storage tank 13, a typical period being approximately one hour. When the salt storage tank 13 has been emptied the air check valve 112 closes to prevent the injection of air into the mineral tank 12. If air were injected into the tank 12, the iron particles which had been built up inside the mineral tank would tend to oxidize and would then be difficult to expel through the top distributor 19.

The next operating phase of the control valve 14 and the regeneration cycle is the "slow brine rinse" phase. This phase consists of merely continuing the injection of raw water into the mineral tank 12 after the brine has been completely drawn from the salt storage tank 13 and the air check valve 112 has closed. The raw water churns slowly through the mineral tank 12 and gradually carries the brine and suspended iron particles which remain in the tank 12 after the "slow brine draw" phase out the drain 29. The length of the "slow brine rinse" may vary according to the requirements of the system, a typical period being three-quarters of an hour.

The next operating phase of the control valve 14 and the regeneration cycle is the "fast rinse" phase. When the "slow brine rinse" has continued for a predetermined period of time, the electric timer mechanism 115 activates the fast rinse solenoid 64 to allow the direct passage of raw water from the outlet chamber 32 through the fast rinse passage 54 to the conditioned water inlet 26 and the mineral tank 12, in the manner previously described, to produce a relatively fast rinse of the mineral tank 12. The water which is directed into the tank 12 through the fast rinse passage 54 supplements the water entering the tank from the injector throat, which continues to flow during the "fast rinse" phase. The flow of water through the mineral tank 12 during the "fast rinse" operation is several times as great as the flow of water through the tank 12 from the injector means 46 alone. The rate of flow is determined by the size of the "Flo-et" insert 58a, which provides a constant fast rinse flow rate regardless of the water pressure in the outlet chamber 32. The "fast rinse" phase, and the regeneration cycle, is ended when, after a predetermined time, the electric timer 115 de-energizes both the fast rinse and the distribution solenoids 64 and 94. A typical "fast rinse" operating phase will last for approximately 15 minutes, but can be varied to meet the system requirements. It should be noted that during the entire regeneration cycle, from slow brine draw to fast rinse, raw water is available at the outlet opening in case water is needed in the building served by the regenerating water conditioning system.

The de-energizing of the distribution solenoid 94 allows the piston return spring 93 to return the piston 85, and the valve means 70 and bypass means 76, to the position illustrated in FIG. 3, as previously described. The raw water entering the inlet chamber 31 is once more directed through the service port 37 and intermediate chamber 34 to the water conditioning outlet 25 and upper distributor 19.

As the raw water once again flows through the mineral tank 12 for conditioning, the "brine tank refill" operating phase commences. The water which flows from the lower portion 17 of the mineral tank 12 up the internal riser pipe 21 to the conditioned water inlet 26 will flow back through the injector throat 51 into the injector chamber 49 and thence through the brine line 111 to the salt storage tank 13. The water is then used to prepare brine for the next regeneration cycle. The flow from the conditioned water inlet 26 to the salt storage tank 13 will continue until water reaches the desired level in the tank 13 and the float operated brine valve 114 closes. The "brine tank refill" phase will thereby be ended and the normal "service" phase, described above, will resume. It should be noted that the brine refill water comes primarily from the lower portion 17 of the mineral tank 12. Since regeneration of the mineral tank is normally preset to occur during periods of little or no soft water use, this insures that the water drawn from the unit after the "brine tank refill" phase will be soft water.

It is apparent that the operation of a water conditioning system equipped with my automatic control valve is very economical, since very little water is required for regeneration. Approximately one quart of water is used to place the piston 85 in the regenerating position shown in FIG. 4, and the same amount of water will return the piston 85 to the service position shown in FIG. 3. There is practically no measurable water passage through the bleed-off hole 107 of the piston bleed-off insert 101 during the regeneration cycle. If an injector nozzle 50 with a flow rate of 0.15 gallon per minute and a "Flo-et" insert 58a with a flow rate of 0.4 gallon per minute are used, as in a typical system, less than 30 gallons of water would be required for the whole regeneration cycle.

Another advantage of my automatic control valve assembly 14 is that all internal parts can be removed from the valve and replaced therein without requiring the removal of the valve from the mineral tank 12. The valve retainer 71 and attached valves 73 and 74 can be removed by first removing the piston chamber cover 98, the piston 85 and the drain seat 38. The bypass assembly 77 can be removed by removing the outlet chamber end plug 117 and the spring retainer 82. The ball check 42 and buffer 43 can be removed after first removing the check valve chamber end plug 118. The injector nozzle 50 may be removed by first removing the injector end cap 119 and injector screen 53. The injector throat 51 may then be removed from the valve in the same manner as the nozzle 50.

It is understood that the present invention is not confined to the particular construction and arrangement of parts herein enumerated and described, but embraces all such modified forms thereof as come within the scope of the following claims.

I claim:

1. An automatic control valve assembly for a fluid conditioning system comprising, a main body portion having an inlet opening, an outlet opening, a drain opening, and a distribution section, said distribution section having an inlet chamber in communicaiton with said inlet opening, an outlet chamber in communication with said outlet opening, a drain chamber in communication with said drain opening, and an intermediate chamber in communication with said inlet chamber and said drain chamber, bypass means between said inlet chamber and said outlet chamber, valve means to selectively prevent communication of said intermediate chamber with said inlet chamber and with said drain chamber, actuator means to operate said bypass means and said valve means, a water conditioning outlet in communication with said intermediate chamber, a conditioned water inlet connected to said outlet chamber by means of a check valve chamber, check valve means located within said check valve chamber, injector means having an inlet passage in communication with said outlet chamber and having an outlet passage in communication with said conditioned water inlet, said injector means having a reduced pressure throat section, a brine inlet in communication with said reduced pressure throat section, a fast rinse passage connecting said outlet chamber and said conditioned water inlet, fast rinse control means in communication with said fast rinse passage.

2. The invention described in claim 1 wherein the actuator means includes a piston engaged within a main body piston chamber in substantially fluid-tight slidable relation and having a front face and a rear face, said main body having a control passage extending from said inlet chamber to said piston chamber in communication with said piston front face, and wherein actuator control means are located in communication with said control passage to selectively permit communication between said inlet chamber and said piston chamber, said piston being operatively connected to said valve means and said bypass means such that said valve means and bypass means are operated by the displacement of said piston.

3. The invention described in claim 2 wherein said piston is displaced when said actuator control means permits communication between said inlet chamber and said piston chamber, said valve means being actuated to permit communication between said intermediate chamber and said drain chamber and to prevent communication between said intermediate chamber and said inlet chamber, and said bypass means being actuated to permit communication between said inlet chamber and said outlet chamber, and wherein spring means return said piston to its original position when said actuator control means prevents communication between said inlet chamber and said piston chamber, thereby to actuate said valve means to prevent communication between said intermediate chamber and said drain chamber and permit communication between said intermediate chamber and said inlet chamber, and thereby to allow said bypass means to prevent communication between said inlet chamber and said outlet chamber.

4. The invention described in claim 3 wherein said piston rear face is in communication with said drain chamber, and wherein bleed-off means is provided between said piston front and rear faces, whereby to bleed off the water within said piston chamber to said drain chamber when communication between said inlet chamber to said piston chamber is terminated and thereby permit said spring means to return said piston to its original position.

5. The invention described in claim 4 wherein the bleed-off means consists of a bleed-off insert which extends through said piston and has a center opening with an inlet end in communication with said piston front face and an outlet end in communication with said piston rear face, and wherein a seat is mounted within said piston chamber whereby to engage said outlet end in substantially water-tight relation when said piston is displaced by the flow of water from said inlet chamber to said piston chamber, said bleed-off insert having a relatively small bleed-off hole in communication with said center opening and said piston rear face, said bleed-off hole permitting a portion of the water in communication with said piston front face to bleed off to said drain chamber after said piston control means terminates the communication between said inlet chamber and said piston chamber thereby to permit said spring means to initiate the return of said piston to its original position, said bleed-off insert outlet end being removed from said seat during the initial movement of said piston to provide a more rapid bleed-off and a more rapid return of said piston to its original position.

6. The invention described in claim 1 wherein said check valve chamber has a valve seat, said check valve means consists of a check ball engageable with said valve seat in substantially water-tight relation, and wherein a ball check buffer is located adjacent to said valve seat, said buffer having a center opening with a plurality of inwardly extending resilient lugs, said lugs being adapted to engage said check ball to reduce the initial force with which said check ball is engaged by said valve seat.

7. The invention described in claim 1 wherein the control valve main body is directly attachable to an opening of a mineral tank, and wherein an upper distributor is attached to said valve body in communication with said water conditioning outlet, and an internal riser pipe is attached to the valve body in communication with said conditioned water inlet, said upper distributor being extendable into said mineral tank to communicate with said tank upper portion, said internal riser pipe being extenable downwardly through said upper distributor toward said mineral tank lower portion, and wherein a lower distributor is attached to said internal riser pipe for communication with said tank lower portion, said lower distributor being in communication with said conditioned water inlet.

8. The invention described in claim 1 wherein said distribution section includes a bypass port between said inlet chamber and said outlet chamber, a service port between said inlet chamber and said intermediate chamber and a drain seat having a drain passage extending between said intermediate chamber and said drain chamber, and wherein said bypass means includes a bypass valve adapted to selectively close said bypass port, and said valve means includes a service valve and a drain valve adapted to selectively close said service port and said drain passage, respectively.

9. The invention described in claim 1 wherein a constant flow means is located within the fast rinse passage for maintaining the flow of water through said passage substantially constant regardless of the water pressure in said system.

10. The invention described in claim 1 wherein the bypass means includes a bypass assembly located within a bypass chamber separating said inlet and outlet chambers, and wherein a bypass port extends between said bypass chamber and said inlet chamber, said bypass means having a bypass valve adapted to engage said bypass port in substantially water-tight relation to prevent communication between said inlet and outlet chambers, and having a bypass plunger attached to said bypass valve and extending through said bypass port in slidable spaced relation, said bypass plunger being adapted to be engaged by said actuator means to disengage said bypass valve and said bypass port and direct a flow of water from said inlet chamber to said outlet chamber, said bypass means having a bypass valve spring operatively connected to said bypass valve whereby to re-engage said bypass valve and said bypass valve port when said bypass plunger is disengaged by said actuator means to prevent the flow of water from said inlet chamber to said outlet chamber, said bypass valve spring being retained in fixed relation to said main body portion by means of a bypass valve spring retainer threadedly engaged within said main body portion between said bypass chamber and said outlet chamber, said spring retainer being adapted to allow water to pass from said bypass chamber to said outlet chamber.

11. The invention described in claim 10 wherein at least one bypass groove extends through said control valve main body and past said bypass valve spring retainer, said bypass groove providing unrestricted communication between said bypass chamber and said outlet chamber.

References Cited by the Examiner

UNITED STATES PATENTS

| | | | |
|---|---|---|---|
| 2,144,952 | 1/39 | Williams et al. | 137—533.11 |
| 2,853,100 | 9/58 | Donnelly | 137—604 |
| 2,855,042 | 10/58 | Kryzer | 137—599.1 |
| 2,855,364 | 10/58 | Roberts | 210—35 |
| 2,874,719 | 2/59 | Van Tuyl | 137—604 |
| 2,899,974 | 8/59 | Gratzmuller | 137—533.11 |
| 2,945,475 | 7/60 | Sheesley | 121—38 |
| 2,962,437 | 11/60 | Lindsay | 210—35 |
| 2,965,072 | 12/60 | Kriechbaum | 121—38 |
| 3,008,486 | 11/61 | Schulze et al. | 137—599.1 |

MORRIS O. WOLK, *Primary Examiner.*

EARL M. BERGERT, *Examiner.*